United States Patent
Bergeron et al.

(10) Patent No.: US 7,486,438 B2
(45) Date of Patent: Feb. 3, 2009

(54) HIGH-RESOLUTION OPTICAL IMAGING SYSTEMS

(75) Inventors: Alain Bergeron, Sainte-Foy (CA); Hubert Jerominek, Sainte-Foy (CA); Nichola Desnoyers, Saint-Nicolas (CA)

(73) Assignee: Institut National D'Optique, Sainte-Foy, Quebec (CA)

( * ) Notice: Subject to any disclaimer, the term of this patent is extended or adjusted under 35 U.S.C. 154(b) by 221 days.

(21) Appl. No.: 11/118,268

(22) Filed: Apr. 28, 2005

(65) Prior Publication Data

US 2006/0245046 A1    Nov. 2, 2006

(51) Int. Cl.
G02B 23/00    (2006.01)

(52) U.S. Cl. .................... 359/366; 359/399
(58) Field of Classification Search .......... 359/366, 359/399, 859
See application file for complete search history.

(56) References Cited

U.S. PATENT DOCUMENTS

| | | | |
|---|---|---|---|
| 4,123,136 A * | 10/1978 | Dahab et al. | 359/555 |
| 4,471,448 A * | 9/1984 | Williams | 356/139.04 |
| 4,633,317 A | 12/1986 | Uwira et al. | |
| 4,652,928 A | 3/1987 | Endo et al. | |
| 5,138,484 A * | 8/1992 | Schubert et al. | 359/350 |
| 5,180,912 A | 1/1993 | McEwen et al. | |
| 5,291,327 A | 3/1994 | McEwen | |
| 5,406,412 A * | 4/1995 | Zehnpfennig et al. | 359/399 |
| 5,729,376 A | 3/1998 | Hall et al. | |
| 5,734,516 A * | 3/1998 | Sayede | 359/871 |
| 5,774,179 A | 6/1998 | Chevrette et al. | |
| 5,798,875 A | 8/1998 | Fortin et al. | |
| 6,366,399 B1 | 4/2002 | Rogers | |
| 6,404,547 B1 * | 6/2002 | Hull | 359/399 |
| 6,593,561 B2 | 7/2003 | Bacarella et al. | |
| 2006/0018012 A1 * | 1/2006 | Smith et al. | 359/366 |

FOREIGN PATENT DOCUMENTS

JP    03271710 A    * 12/1991
JP    2001350103 A    * 12/2001

OTHER PUBLICATIONS

R. Kennedy McEwen, "European Uncooled Thermal Imaging Technology", SPIE, vol. 3061, Aug. 1997, pp. 179-190.

* cited by examiner

*Primary Examiner*—Alessandro Amari
*Assistant Examiner*—Mark Consilvio
(74) *Attorney, Agent, or Firm*—Merchant & Gould P.C.

(57) ABSTRACT

High-resolution imaging systems are provided. In one embodiment, an imaging system based on a Cassegrain or Schmidt-Cassegrain objective, with coaxial primary and secondary mirrors, is provided with a microdisplacement mechanism acting on the secondary mirror to displace the image on a focusing array. In another embodiment, two co-axial Cassegrain-type objectives are provided one within the other with a common focal plane array, which therefore detects combined wide field-of-view and narrow field-of-view images.

19 Claims, 8 Drawing Sheets

HIGH-RESOLUTION OPTICAL IMAGING SYSTEMS

FIELD OF THE INVENTION

The present invention relates to the field of optical imaging systems, and more particularly concerns Cassegrain-type imaging system having an improved resolution.

BACKGROUND OF THE INVENTION

In the field of optical surveillance, there is always a need for improved detection, recognition and identification of a target at a distant range. Long distance surveillance usually implies the use of 2D focal plane arrays, also know as starring arrays or area image sensors, which have the advantage of recording a bi-dimensional image all at once, without the need to scan different parts sequentially. To obtain a high resolution with such arrays, it is however necessary to use long focal length and a low numerical aperture optics providing sufficient light collection for efficient imaging. In order to meet these two requirements, the resulting devices are generally large, bulky and heavy, making them costly to manufacture and awkward to handle.

One known solution to make an imaging system more compact is the use of a catadioptric design, which applies both reflective and refractive components in its construction. An example of such a design is Schmidt-Cassegrain objective. Cassegrain objectives are well known in the field of astronomy for the design of telescopes, and include two coaxial mirrors. The primary mirror has a concave optical surface reflecting the incoming light towards the secondary mirror, which generally has a convex reflecting surface focussing the light beam on a focal plane. The image formed is free of spherical aberration and is usually located at or behind the vertex of the primary mirror. In a Schmidt-Cassegrain variation, corrective lens elements are used either at the entrance of the objective or in the path of the light beam reflected by the two mirrors.

Referring to U.S. Pat. No. 6,593,561 (BACARELLA, et al) a basic design for a catadioptric objective is shown. An example of a more complex catadioptric imaging system combining reflective and refractive surfaces is shown in U.S. Pat. No. 6,366,399 (ROGERS). U.S. Pat. No. 5,729,376 (HALL et al) provides another such system where two imaging planes are provided.

It is also known in the art to improve the resolution of an image captured by a focal plane array by displacing the image over the surface of the array, detecting it at various positions and combining the resulting detected views, compensated for the displacement. The principle behind this approach is for example explained in section 5 of "*European uncooled thermal imaging technology*" by McEwen, SPIE vol 3061, pp 179-190. Various techniques are known in order to provide this image displacement. In U.S. Pat. No. 5,180,912 (MCEWEN et al) and U.S. Pat. No. 5,291,327 (MCEWEN), a refractive microscanning system based on a rotating refractive chopper has been suggested. U.S. Pat. No. 4,652,928 (ENDO et al) suggests the vibration of a CCD detector to oversample an incoming image. The displacement amplitude of the CCD has to be equal to half the pixel pitch of the detector. In U.S. Pat. No. 4,633,317 (UWIRA et al), a rotating refractive wedge provides a continuous circular displacement of an image over a detector, where the wedge type rotating element induces a lateral displacement of the image for a charge-coupled detector array. Alternatively an electromagnet based displacement of a primary large planar mirror, not intrinsically athermalized, is suggested. Finally, U.S. Pat. No. 5,798,875 (FORTIN et al) and U.S. Pat. No. 5,774,179 (CHEVRETTE et al) suggest a microscan system based on the lateral translation of a lens or alternatively of a set of lenses.

In spite of the above-mentioned technological advances, there is still a need for a compact and high-resolution imaging system which can be used for scene observation, and would provide adequate precision for various applications requiring detection, recognition and identification of a target or more generally surveillance.

SUMMARY OF THE INVENTION

According to a first aspect of the present invention, there is provided an optical imaging system for obtaining a high-resolution image of an observation area from a plurality of low-resolution images thereof.

The system first includes a Cassegrain-type objective for forming the low-resolution images. This objective has a primary mirror defining a concave optical surface, and a secondary mirror disposed coaxially with the primary mirror. The secondary mirror has a mirror plane and defines a convex optical surface therealong. The imaging system also includes a focal plane array generally disposed at a focal plane of the objective, for detecting the low-resolution images therefrom. A microdisplacement mechanism is finally provided for pivoting the secondary mirror about first and second orthogonal axes in the mirror plane in order to displace in a leveraged manner the low-resolution images along the focal plane array, so that combining these low-resolution images yields said high-resolution image.

Advantageously, the present invention provides a multispectral imaging system combining a catadioptric objective with a controlled microdisplacement system attached to a secondary mirror. In the preferred embodiment, the multispectral imaging system is equipped with a large concave primary mirror and a small convex secondary mirror generally disposed in the form of a "Schmidt-Cassegrain" objective, and a focal plane array of detectors. The generally convex secondary mirror is equipped with an actuator-driven microdisplacement mechanism perpendicular to the plane of the secondary mirror and operating below mechanical resonance frequency, including a leverage path, providing a one-dimensional or bi-dimensional sampling of the image across the focal plane array by predetermined steps, typically a fraction of the array pitch. The preferred imaging system is also equipped with a corrective low power optical element. The optics and microdisplacement mechanism are also preferably athermalized.

Preferably, the system has a circular coaxial geometry and is equipped with a single set of mirrors and a single focal plane array, or it may alternatively include multiple sets of mirrors, focal plane arrays and corrective windows optimized for various spectral bands. A combination of multiple sets of circular coaxial optical elements such as mirrors and lenses combined with the microdisplacement mechanism advantageously provides an increase in spatial resolution of the images recorded by the focal plane arrays, without actually increasing the number of detectors being part of these focal plane arrays, or without reducing the detector pitch.

According to second aspect of the invention, there is also provided an optical imaging system for obtaining a multi-field-of-view image of an observation area from a wide field-of-view image and a narrow field-of-view image thereof.

This system includes a wide field-of-view and a narrow field-of-view Cassegrain-type objective for respectively forming the wide field-of-view and narrow field-of-view images. Each of these objectives has a primary mirror defining a concave optical surface, and a secondary mirror disposed coaxially with the primary mirror and defining a convex optical surface. The wide field-of-view objective is positioned coaxially to the narrow field-of-view objective rearwardly of the secondary mirror thereof and non-obstructively to light entering the narrow field-of-view objective. The secondary mirror of the narrow field-of-view objective is provided with a light passage extending therethrough at an apex thereof. The imaging system further includes focussing means for focussing and superposing both of the wide field-of-view and narrow field-of-view images at a same focal plane. A focal plane array is generally disposed at this focal plane for detecting the superposed wide field-of-view and narrow field-of-view images, thereby obtaining the multi-field-of-view image.

Advantageously, the imaging system according to this aspect of the invention may be provided with a microdisplacement mechanism of one or both secondary mirrors as described above. According to preferred embodiments of the invention, the wide field-of-view and narrow field-of-view objectives may be separate devices, or combined by using the outer and inner surfaces of a same mirror to define respectively the secondary mirror of the narrow field-of-view objective and the primary mirror of the wide field-of-view objective.

Other features and advantages of the present invention will be better understood upon reading of preferred embodiments thereof with reference to the appended drawings.

DESCRIPTION OF PREFERRED EMBODIMENTS OF THE INVENTION

Figure 1:
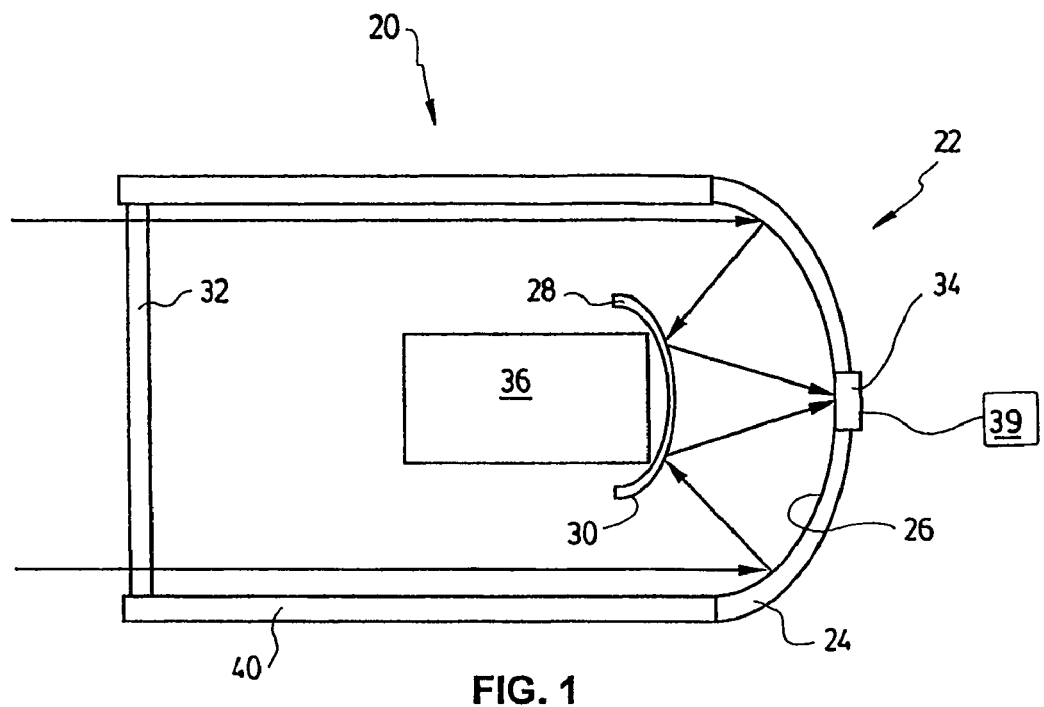
FIG. 1 is a schematized representation of an optical imaging system according to a preferred embodiment of the invention.
Figure 2:
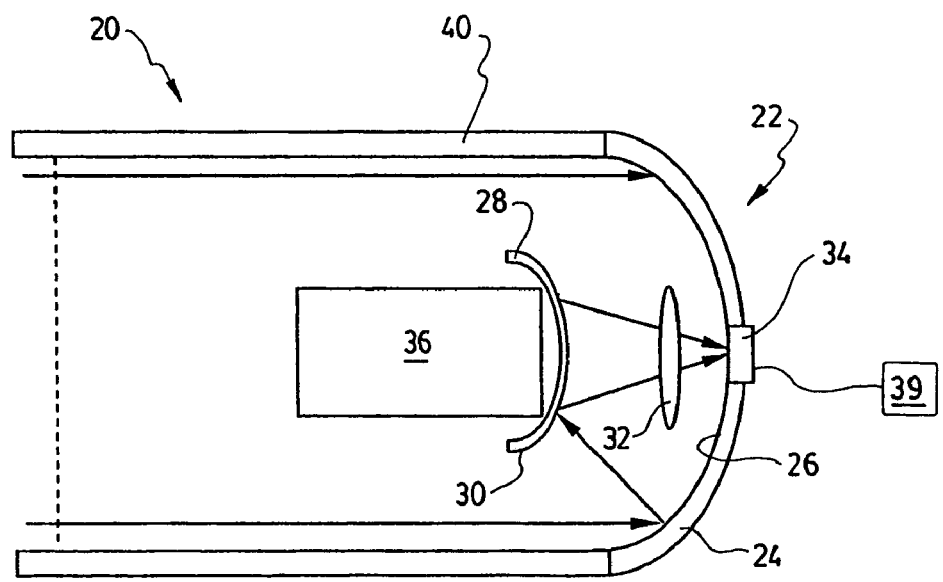
FIG. 2 shows a variant of the embodiment of FIG. 1.

Referring to FIGS. 1 and 2, variants of an optical imaging system 20 according to a preferred embodiment the present invention are illustrated.

The optical imaging system 20 includes a Cassegrain-type objective 22 for forming low-resolution images of an observation area. The expression "low resolution" images is used herein to define the images obtained directly from the objective, by contrast with the images of an improved resolution obtained from the device as a whole, which are referred to as "high-resolution" images. Of course, these designations are not limitative to the quality of image obtainable from the Cassegrain-type objective itself, and one skilled in the art will readily understand that it would be advantageous in practice to obtain as precise an image as possible from this objective.

As explained above a Cassegrain-type objective is generally formed of two coaxial mirrors focussing incoming light on a focussing plane. The objective 22 according to the present invention therefore includes a primary mirror 24, which defines a concave optical surface 26 reflecting light received in the objective. A secondary mirror 28 is disposed coaxially with the primary mirror 24 and defines a convex optical surface 30 reflecting light from the primary mirror towards the focal plane.

It is understood that any objective having these basic characteristics is said to be of the "Cassegrain-type" as used throughout the present application. This definition includes any variant to this configuration such as a Schmidt-Cassegrain objective or any other design which incorporates the use of coaxial primary and secondary mirrors as described above. One skilled in the art will therefore readily understand that the present invention is in no way limited to the use of a "traditional" Cassegrain objective.

Preferably, the objective 22 further includes at least one correction refractive element for correction aberrations in the images generated, so that the objective corresponds in effect to a Schmidt-Cassegrain configuration. In the embodiment of FIG. 1, a corrector element 32 is provided for this purpose at the entrance of the objective 22. In the variant of FIG. 2, the corrector element 32 is provided between the secondary mirror 28 and the focal plane. Of course, both corrector elements could be used in a same objective, and any other appropriate configuration is also believed to be within the scope of the present invention The imaging system 20 further includes a focal plane array 34, which is generally disposed at the focal plane of the objectives for detecting the low-resolution images therefrom. The focal plane array 34 may be embodied by any bi-dimensional array of detectors apt to detect an image without the need for scanning. Although the expression "focal plane array" is used in the present case, it will be clear to one skilled in the art that such an array need not be positioned at the precise focal plane of the system, but could be offset therefrom as long as it does not interfere with the light acquisition process.

Depending on the design of the objective, the focal plane array 32 can be positioned at the apex of the primary mirror, or beyond; in the second case, the primary mirror is preferably provided with an opening allowing light to pass therethrough. Positioning of the focal plane outside the primary mirror apex simplifies the system integration because the primary mirror does not need to be machined to incorporate the focal plane array, as well as intermediary active components such as microshutter.

The imaging system 20 also includes a microdisplacement mechanism 36 for pivoting the secondary mirror 28 about orthogonal axes in its mirror plane. This movement has the effect of displacing the low-resolution images along the focal plane array, so that combining these low-resolution images yields the desired high-resolution image. It is to be noted that the microdisplacement mechanism does not operate on the focal plane array, but rather on the secondary mirror thus reducing the risk of detector damage and advantageously creating a "leverage effect", as will be better explained further below.

With reference to FIGS. 3 and 5A to 5C in the preferred embodiment the microdisplacement mechanism 36 preferably includes two actuators 38 which each apply a force transversally to the secondary mirror plane in order to pivoting according to each one of the orthogonal axes, respectively. In the preferred embodiment, one actuator is situated at a lateral side of the secondary mirror and the other is at the top or bottom thereof. Although only one such actuator is shown in the drawings it is understood that a similar set-up is provided at a generally right angle to the illustrated one.

Figure 3:
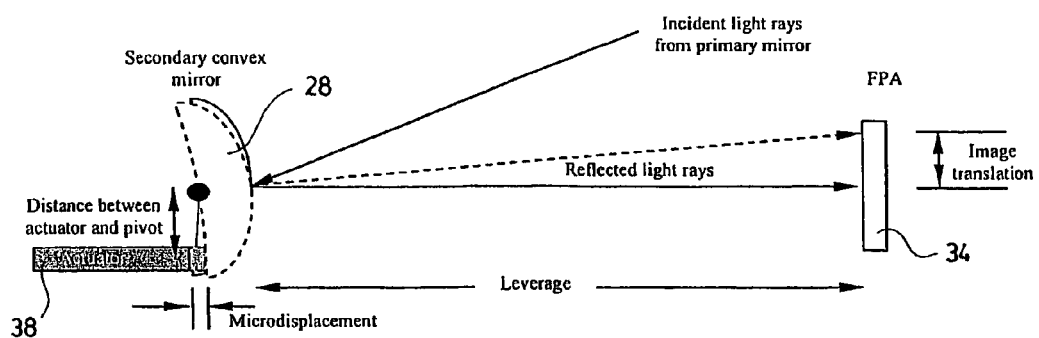
FIG. 3 illustrates the principle of the secondary mirror displacement according to an advantageous feature of the present invention.

Referring more particularly to FIG. 3, the principle behind the operation of the microdisplacement mechanism is explained. The actuator 38 pushes the secondary mirror 28 generally transversally to its mirror plane back and forth, causing the incident light rays coming from the primary mirror to move laterally. Following the reflection from the secondary mirror, the light rays impinge on the focal plane array 34. The distance between the secondary mirror and the focal plane array acts as a leverage of the initial actuator microdisplacement. The image translation is related to the microdisplacement by the following equation:

$$\text{Image translation} = \frac{\text{Microdisplacement} \times \text{Leverage}}{\text{Distance between actuator and pivot}}$$

It will be understood that the lateral image translation shown on FIG. 3 is exaggerated for illustrative purposes and is not in scale with the drawing.

The larger the distance between the secondary mirror and the focal plane array, the larger will be the leverage of the displacement provided by the actuator compared to the final image displacement. The architecture based on a convex secondary mirror, combined with a concave primary mirror, advantageously offers a large distance between the secondary mirror and the focal plane array, which is fully taken advantage of by providing the microdisplacement mechanism on the secondary mirror instead of the focal plane array. The resulting translation of the image is thus the amplified original microdisplacement of the secondary mirror.

The use of a secondary mirror having a convex optical surface is also advantageous to the present embodiment. The convex optical surface maximizes the distance, and therefore the leverage, between the secondary mirror and the focal plane. The convex mirror also allows the focal plane to be positioned outside the apex of the primary mirror, without increasing the size of the optics. If the focal plane array is placed at a given distance from the apex, the secondary convex mirror may be given a smaller diameter than what would be possible with a secondary concave mirror. A diameter as small as possible for the secondary mirror is advantageous since it causes less obscuration of the incoming light. A smaller diameter means more light entering the objective improving as such the detection performances.

It is an advantageous feature of the preferred embodiment of the present invention that the actuators act on the secondary mirror perpendicularly to the mirror plane. To achieve precisely controlled microdisplacement, an actuator and a configuration exhibiting a large force must be used. To maximize the force being developed by the actuator, it must be collinear with the expansion of the actuator. The actuator is therefore oriented in the direction of the mirror displacement and perpendicular to the mirror plane. It will be understood that the term "perpendicular" is used in this context to describe the orientation of the actuator in a general manner, and does not refer to a precise alignment of this actuator with respect to the mirror plane. This perpendicular orientation yields a larger force and a more compact system than parallel bending actuator systems.

The resulting cross-section of a system using a compact perpendicular microdisplacement system is reduced compared to a non-compact actuating system. This has an important impact on the achievable amount of light collected by the imaging system. For a given focal length and a given diameter, a smaller cross-section of the microdisplacement mechanism implies a larger receiving surface for the incoming light resulting in better light collection. Alternatively, for a given focal length and a given amount of light collected, a smaller cross-section implies a smaller objective diameter resulting in a smaller and lighter overall optical system. The compact perpendicular architecture therefore can be used to either improve light collection or reduce optics diameter.

The provision of a perpendicularly actuated mechanism is also characterized by a high natural frequency of oscillations compatible with non-resonant mode. In order to operate the microdisplacement system, two modes can be chosen: oscillation in a resonant mode or oscillation in a non-resonant mode. A system oscillating in a resonant mode does not allow the precise control of the position at each time. It can also suffer from varying delays between actuation and actual displacement. Furthermore, the level of noise generated in this mode is very high.

In order to maximize signal integration and spatial correspondence, the microdisplacement system motion should preferably be well controlled, which is better achievable in an oscillating mode without resonance. The maximum displacement speed, and the displacement curve profile, is thus set to avoid excitation of the mechanical natural oscillation frequencies of the system. This provides a better control over the microdisplacement and a much reduced noise signature compared to mechanically oscillating systems. The image lateral displacement is set to a fraction of the size of a single pixel of the focal plane array.

Furthermore the operation in non-resonant mode allows avoiding the requirement for complex heterodyning detection coupled to the frequency of oscillation of the mirror. This simplifies the detection electronics and provides a true pixel by pixel detection scheme.

The microdisplacement mechanism can be made of various materials, nevertheless the use of composite materials will reduce excitation of higher resonant modes improving as such the precision of the control over the displacement and reducing the noise generation. This is a consequence of the microstructure of the composite materials that inherently absorb higher mechanical frequencies.

It will again be noted that the microdisplacement mechanism is advantageously acting on the small secondary convex mirror. Applying the microdisplacement to the secondary mirror, which is the lightest component of the design, requires less force to achieve the image motion. Also, acting on a mirror component provides twice the angular motion of the reflected light ray compared to the one resulting from applying the force to a refractive element.

Still referring to FIG. 3, in the preferred embodiment, the actuators 38 are piezoelectric elements which are spring-driven in fully compressed mode. Actuators usually operate better in a compression mode rather than in a tension mode. The actuator is thus precompressed with springs for an operation in a fully compressed mode. The use of springs is possible due to the larger force deployable with the perpendicular actuator configuration which would not be the case with a parallel bending system. Furthermore, the need for two actuators for a given axis displacement, one that would move the mirror clockwise and the other counter clockwise, is avoided in such a configuration. The operation of the microdisplacement system over the two orthogonal axes requires thus two actuators instead of four compared to the uncompressed architecture. It will however be noted that a four actuators system, although less advantageous, would still be considered within the scope of the present invention.

Figure 4:
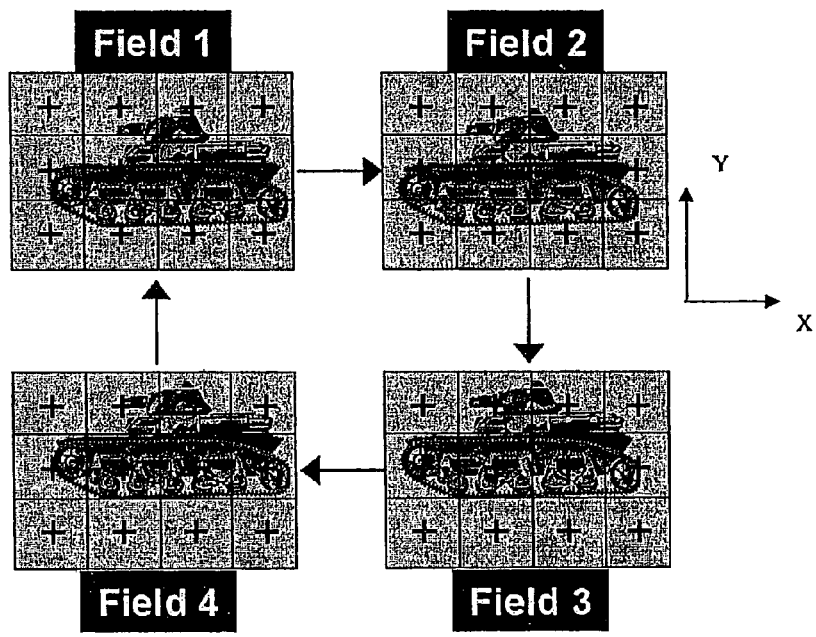
FIG. 4 shows the displacement of an image on a focal plane array obtained with a system according to the present invention.

Referring now to FIG. 4, the generation of the high-resolution image using the various displaced low-resolution images generated by the present system is explained. In field 1, the image is acquired in a first position on the array. The image then is displaced laterally along the X direction by a fraction of pixel, and field 2 is acquired. In the next step the image is displaced orthogonally, in the Y direction, to be sampled again (field 3). The image is then displaced back to its initial X position to be sampled again at field 4 before returning to its initial location. The four images acquired are assembled with the same pixel sequence as illustrated. Pixel 1 from field 2 is positioned to the right of pixel 1 from field 1; pixel 1 from field 3 is positioned below and right to pixel 1 from field 1; pixel 1 from field 4 is positioned directly below pixel 1 from field 1.

A frame, corresponding to the final high-resolution image is generated when the four fields are acquired and assembled. The frame generation rate is one fourth the field acquisition rate. The generation sequence could of course be changed provided that the image assembly is modified in consequence. Appropriate imaging electronics 39 (see FIGS. 1 and 2), as already known in the art, may be provided with the system of the present invention in order to generate this frame.

Referring back to FIGS. 1 and 2, according to another feature of the preferred embodiment of the invention, the imaging system described above is advantageously athermalized. This is preferably achieved through the use of a housing structure 40 supporting the primary mirror 24 and secondary mirror 28, and made of a same material as these mirrors, for example aluminum. Athermalisation is therefore intrinsically included in the design of the objective over a temperature range from −30° C. to +40° C.

Figures 5A, 5B, 5C:
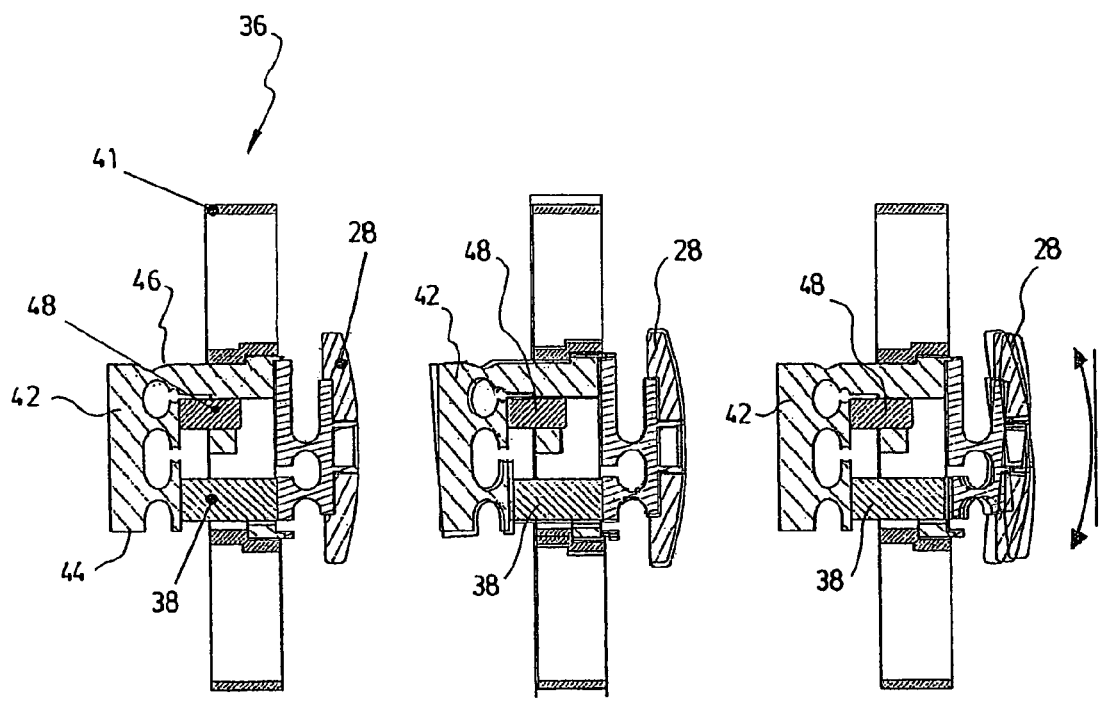
FIG. 5A is a cross-sectional side view of a microdisplacement mechanism according to a preferred embodiment of the invention.
FIG. 5B shows the microdisplacement mechanism of FIG. 5A subjected to temperature variations.
FIG. 5C shows the microdisplacement of FIG. 5A in operation mode.

The microdisplacement mechanism is also preferably athermalized. Preferably, it includes an athermalizing structure compensating for temperature-induced variations on the pivoting of the secondary mirror. Referring to FIGS. 5A to 5C, there is shown a preferred embodiment of such an athermalizing structure. It includes a lever 42 made of a material having a coefficient of thermal expansion different from the one of the actuator. The first end 44 of the lever is interconnected with the actuator 38, and its second end 46 abuts on a generally temperature-invariant pivot 48. In the preferred embodiment, the actuator 38 is a piezoelectric element, which has a coefficient of thermal expansion smaller than the one of the lever (42). The lever 42 is made of aluminum which expends with an increase in temperature and the pivot 48 is made of invar. The length of the thermal pivot and the lever must be properly selected to compensate the thermal expansion of the actuator. As can be seen in FIG. 5B, the athermalizing structure compensates for the transversal pointing misalignment of the secondary mirror resulting from temperature variations. FIG. 5C illustrates how the temperature compensated actuator is then used to effect the pivoting of the secondary mirror 28.

Figure 6:
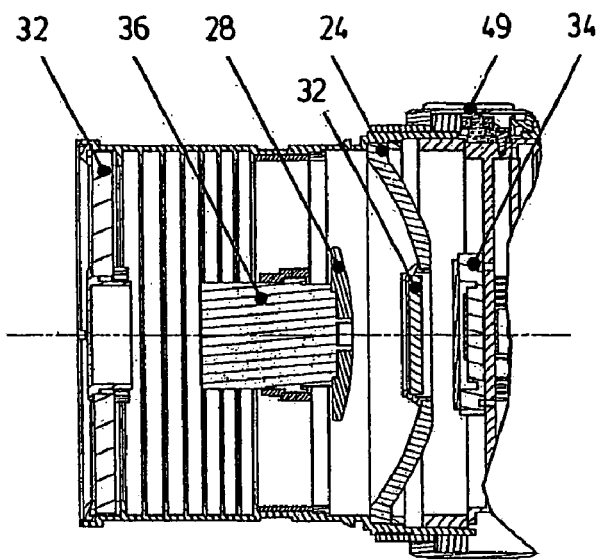
FIG. 6 is a cross-sectional side view of an imaging system according to the embodiment of FIG. 1.
Figure 7:
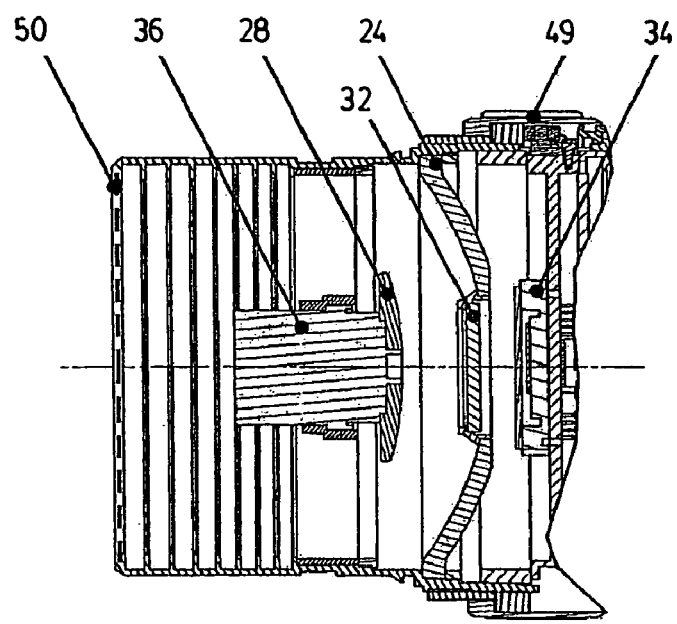
FIG. 7 is a cross-sectional side view of an imaging system according to the variant of FIG. 2.

Practical examples of imaging systems built according to the principles of the present invention are shown in FIGS. 6 and 7. In the device of FIG. 6, light passing through the corrector element 32 falls onto the primary mirror 24 and is reflected to the secondary mirror 28 actuated by a microdisplacement mechanism 36. The reflected light, that is, the image generated, passes through a second refractive corrective element 32 before impinging on the focal plane array 34. The microdisplacement mechanism induces a lateral displacement of the image on the focal plane array. In the illustrated embodiment, a focusing mechanism 49 is optionally provided to keep the images thereon in focus.

Similarly, in the device of FIG. 7, light first passes through an optional protective element with zero optical power 50, falls onto the primary mirror 24 and is reflected to the secondary convex mirror 28 actuated by a microdisplacement mechanism 36. The reflected light passes through a refractive element 32 before impinging on a focal plane array 34. The microdisplacement mechanism again induces a lateral displacement of the image on the focal plane array. A focusing mechanism 49 may optionally be provided.

Figure 8:
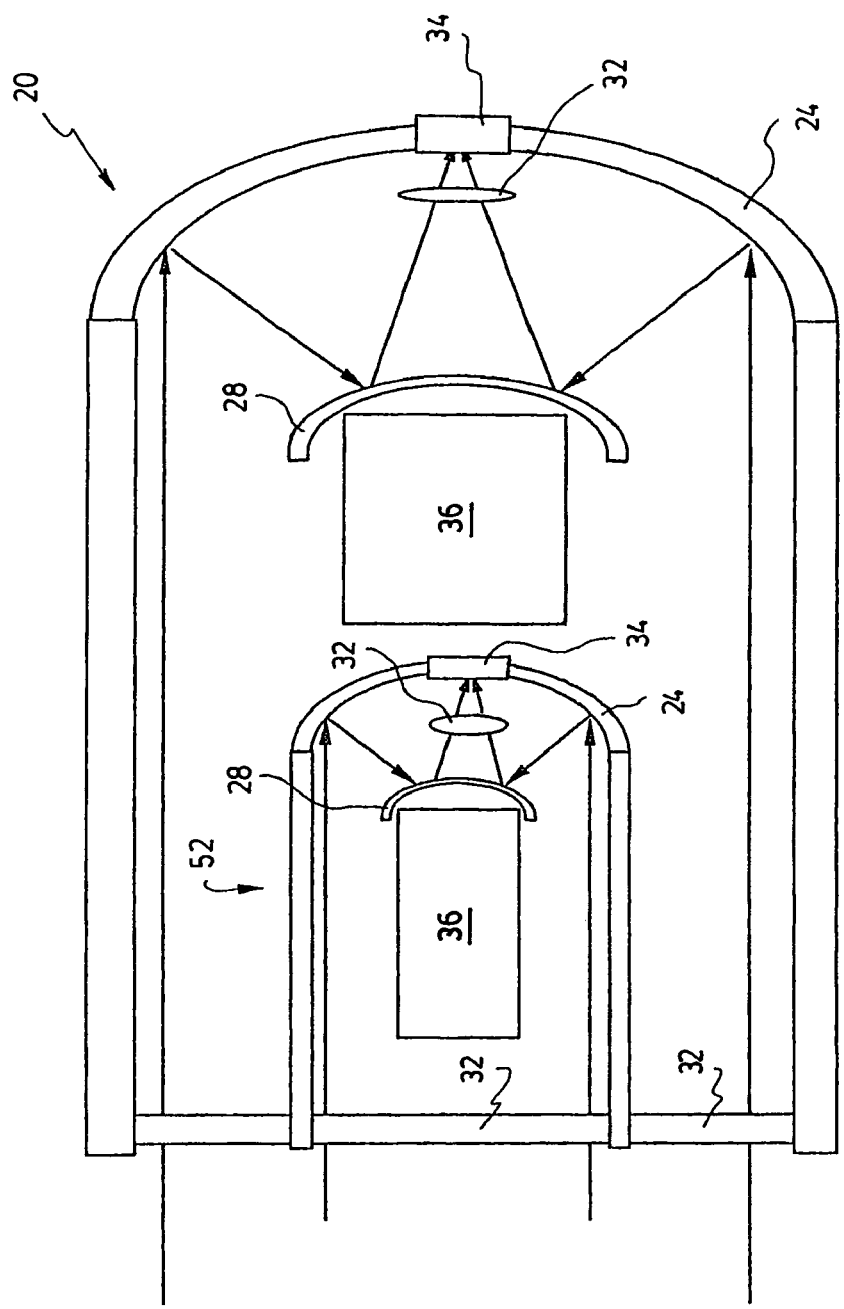
FIG. 8 is a schematized representation of a dual-field-of-view optical imaging system according to another embodiment of the invention.
Figure 9A:
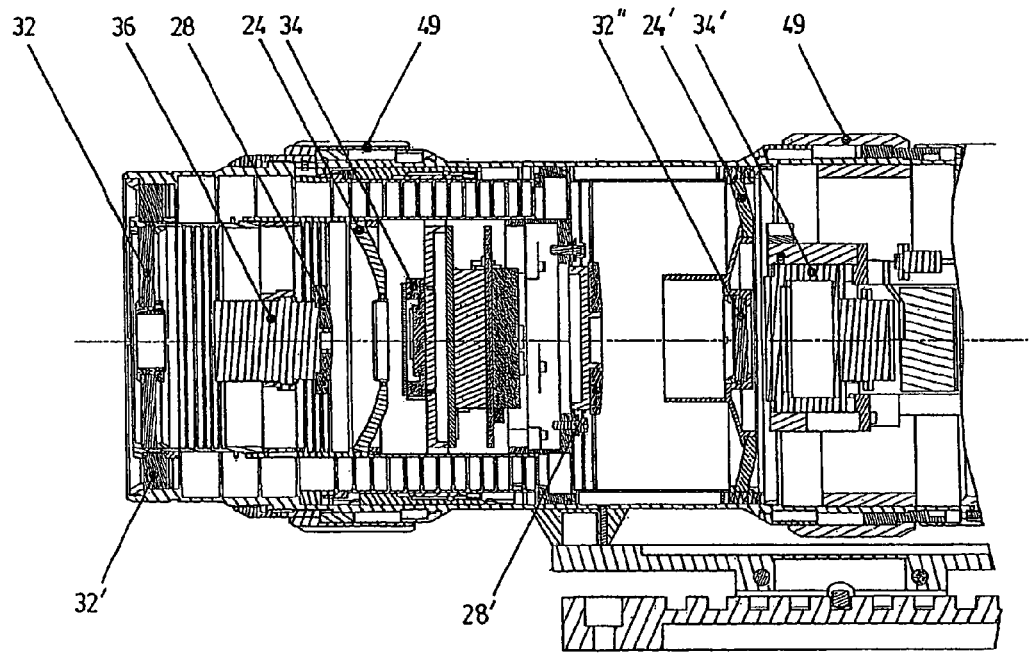
FIG. 9A is a cross-sectional side view of an imaging system according to the embodiment of FIG. 8.
Figure 9B:
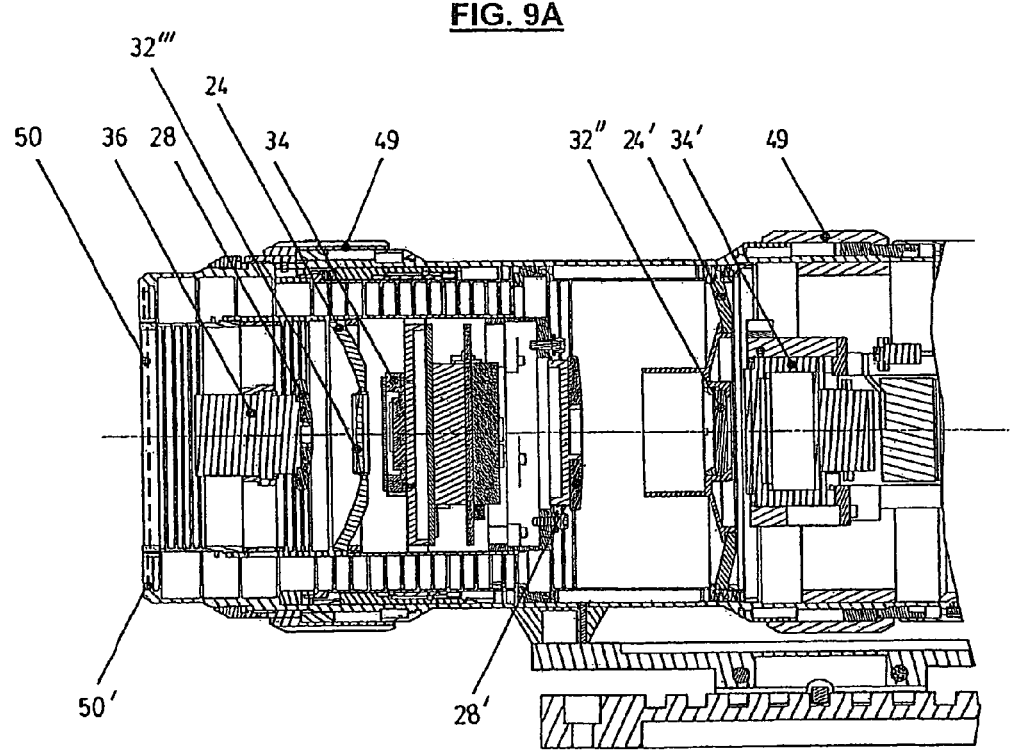
FIG. 9B is a cross-sectional side view of a variant to the system of FIG. 9A.

A common requirement in the infrared surveillance is the possibility to observe a large field-of-view with a given resolution and simultaneously observe a narrow-field-of-view with an enhanced resolution. Referring to FIGS. 8, 9A and 9B, according to another embodiment of the present invention, the imaging system 20 as described above is preferably provided with a similar complimentary imaging system 52. The high-resolution image obtained by both systems is preferably combined by an appropriate signal combiner to generate a dual field-of-view image.

The two imaging systems are combined together with coaxial line of sight. The outer objective is a narrow field-of-view objective 20, whereas the central objective is a wide field-of-view objective 52. Each objective includes a primary mirror 24, a secondary mirror 28, a microdisplacement mechanism 36 and optionnal corrective elements 32 as described above. Both objectives are equipped with focal plane arrays 34 operating in the same wavelength band or in two different wavelength bands. Preferably, the use of two catadioptric objectives with thermally compensated compact perpendicular microdisplacement systems provides full athermalization of the system.

Preferably, the light incoming from the observation area is detected and converted into digital or analog format. The information from both focal plane arrays is combined electronically into a single image. The narrow field-of-view information, having a higher resolution is positioned in the central portion of the image. The wide field-of-view information of lower resolution is positioned on the remaining sides of the image. This combined objective offers a wide field-of-view, providing larger field of observation, and a better central resolution in a narrow field-of-view, providing longer ranges for target detection/recognition.

Referring more particularly to FIG. 9A, there is shown a multiple field-of-view multi-spectral configuration according to the principles above. In the first channel, the light passing through the corrector element 32 falls onto the primary mirror 24 and is reflected to the secondary mirror 28 actuated by a microdisplacement mechanism 36. The reflected light propagates before impinging on the focal plane array 34. The microdisplacement mechanism induces a lateral displacement of the image on the array, and an optional focusing mechanism 49 keeps the image in focus. In the second channel, the light passes through a corrector element 32' and is reflected by a primary mirror 24' onto a secondary mirror 28'. Following propagation and transmission through an optional refractive element 32" the image is acquired by the focal plane array 34' optionally provided with a focusing mechanism 49. The secondary mirror 28' of the narrow field-of-view objective could be alternatively equipped with a microdisplacement mechanism. Both objectives are concentric. FIG. 9B shows a variant to the embodiment above, where the corrective elements 32 and 32' at the entrance of the objectives are replaced by respective optional protective element 50 and 50', and an additional corrector 32''' is provided in front of the focal plane arrays 34 of the wide field-of-view objective.

Figure 10:
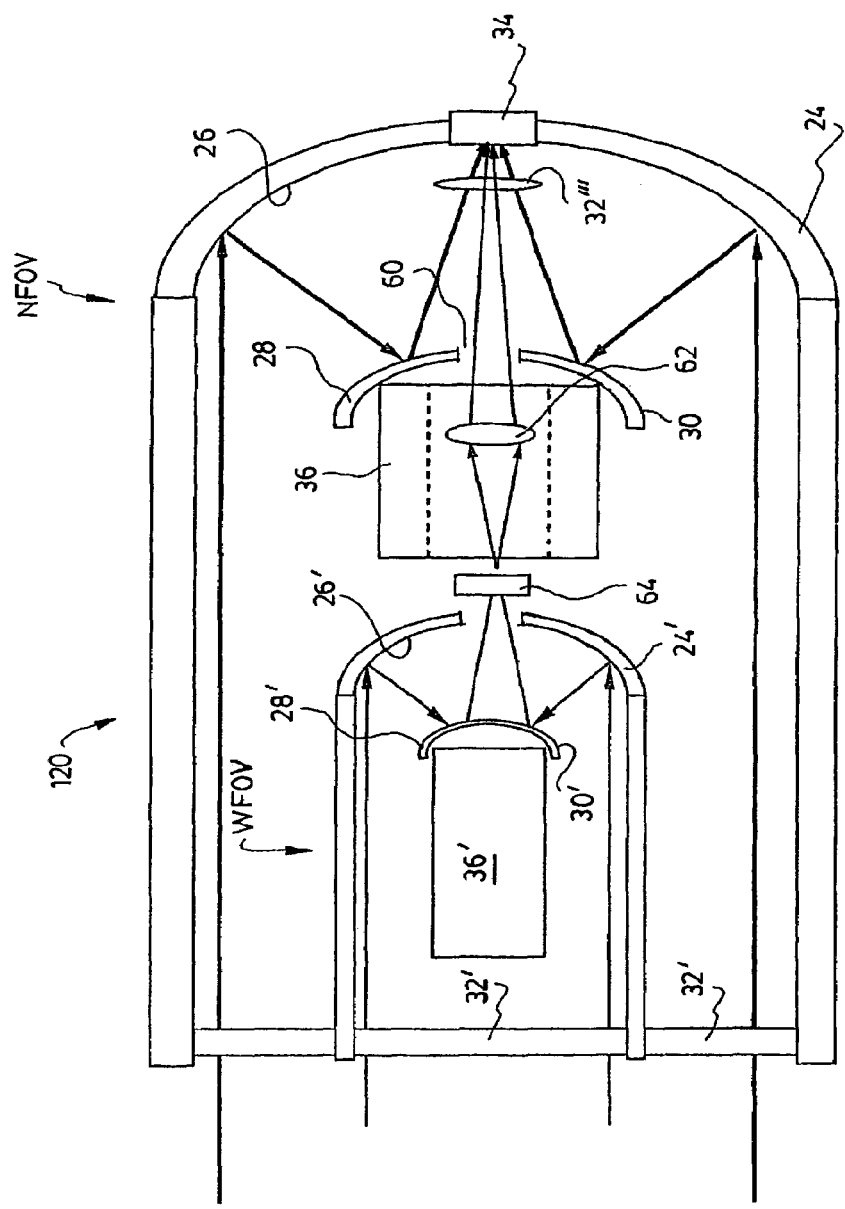
FIG. 10 is a schematized representation of a dual-field-of-view optical imaging system according to another aspect of the invention.
Figure 11:
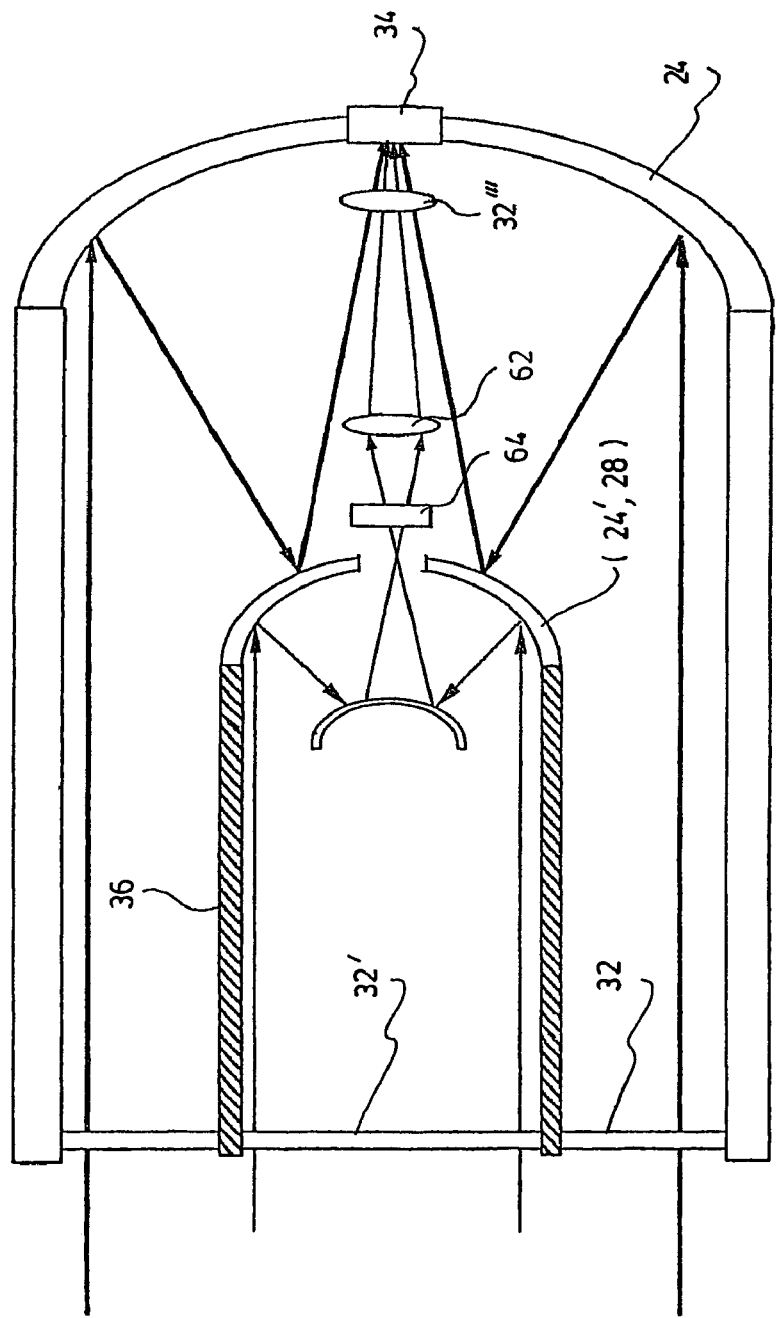
FIG. 11 is a schematized representation of a dual-field-of-view optical imaging system according to a variant to the embodiment of FIG. 10.

Referring now to FIGS. 10 and 11, according to another aspect of the present invention, there is also provided an optical imaging system 120 for obtaining a multi-field-of-view image of an observation area, from a wide field-of-view image and a narrow field-of-view image thereof. In such a device two objectives capture the scene at the observation area on a single common focal plane array. This architecture is characterized by the use of a single focal plane array instead of two, consequently reducing the complexity of the electronic driver required. FIGS. 10 and 11 show two exemplary embodiments of such a system.

Generally speaking, the multi-field system according to the present aspect of the invention includes a narrow field-of-view (outer objective) and a wide field-of-view (inner objective) Cassegrain-type objectives respectively designated NFOV and WFOV. Each objective has a primary mirror 24 or 24' defining a concave optical surface 26 and 26' and a secondary mirror 28 or 28' disposed coaxially with the primary mirror. The secondary mirror defines a convex optical surface 30 or 30'. The wide field-of-view objective is positioned coaxially to the narrow field-of-view objective rearwardly of its secondary mirror and non-obstructively to light entering the narrow field-of-view objective. The secondary mirror of the narrow field-of-view objective is provided with a light passage 60 extending therethrough at its apex. Appropriate optics 62 for focussing and superposing both wide field-of-view and narrow field-of-view images at a same focal plane are provided. A single focal plane array 34 is generally disposed at the focal plane for detecting the superposed wide field-of-view and narrow field-of-view images, thereby obtaining the multi-field-of-view image.

FIG. 10 shows a first example of such a double field-of-view single-waveband architecture, including a total of four mirrors and where each secondary mirror is provided with an optional athermalized microdisplacement mechanism 36 perpendicular to the secondary mirror plane. In the central WFOV objective, the light passes through a first optional corrector component 32' and is reflected by the primary mirror 24'. Following reflection on the secondary mirror 28', the light propagates then up to the focal plane array 34 through a relay lens 62 and an optional corrector optical element 32'''. In the NFOV objective, the light propagates through a first optional corrector element 32' and is reflected by the primary and a secondary mirrors 24 and 28 before going through the optional common corrector optical element 32'''. The NFOV is then imaged on the common focal plane array 34. If provided, the microdisplacement mechanism 36 of the NFOV objective is hollow to give a free transmission path to the light collected by the WFOV objective.

The WFOV objective can be further equipped with an optional microshutter 64. When the microshutter 64 is closed, only the NFOV information is acquired by the focal plane array. When the microshutter 64 is opened, the information from both field-of-views is combined, increasing the total field-of-view which enhances the observation capabilities. This also increases the total amount of light collected in the central part of the image which enhances further the detection capabilities. When the WFOV objective is also equipped with an athermalized microdisplacement mechanism, the resolution of the image captured is further improved.

It is to be noted that in each objective (NFOV and WFOV) at least one corrector element is preferably required to obtain good image quality, each objective therefore defining a Schmidt-Cassegrain configuration.

A simplified alternative embodiment is shown in FIG. 11. In this embodiment, the primary mirror of the WFOV objective acts at the same time, on its opposite surface, as secondary mirror for the NFOV objective. This dual use of the mirror eliminates one mirror in the system making the system lighter. Furthermore, in the illustrated embodiment an optional athermalized hollow microdisplacement mechanism is provided perpendicular the secondary mirror plane of the NFOV objective. Because this mirror is also used as primary mirror for the WFOV objective, only a single microdisplacement system is required to increase the resolution in both objectives at the same time.

For this embodiment, In the central WFOV objective, the light passes through a first optional corrector component 32', propagates through the optional hollow microdisplacement mechanism 36 and is reflected by the primary mirror 24' (which is the same as the secondary mirror of the NFOV). Following reflection on the secondary mirror 28', the light propagates up to the focal plane array 34 through a relay lens 62 and an optional corrector optical element 32'''. In the NFOV objective, the light propagates through a first optional corrector element 32 and is reflected by the primary mirror 24 and the secondary mirror 28, which again is the same as the primary mirror 24' of the WFOV, before going through the corrector optical element 32'''. The NFOV is then imaged on the common focal plane array 34. The long distance between the primary mirror of the WFOV and the focal plane array provides an increased leverage for the image translation resulting in reduced microdisplacement requirements. Again, the WFOV objective may be further equipped with an optional microshutter 64 as explained above.

In summary, the imaging systems as described above combined with an electronic driver each provides a camera with improved resolution while keeping the dimensions of focal plane arrays unchanged and consequently keeping the objective size to a minimum. The improved resolution provides longer range of observation capabilities.

It will be noted that such a camera may be further combined with a microdisplay, preferably with resolution equal or higher than the resolution of the final image generated, to display the image to a user. The user will therefore observe the scene with an improved resolution and reduced aliasing compared with prior art devices. Furthermore, the camera may be equipped with a radio-frequency link to transfer the image to a command control. Before transmission the image can be compressed, coded or encrypted to reduce data throughput requirement (bandwidth requirement) and yield better communication security.

In the illustrated embodiments, in order to be operational, the readout frame rate of the focal plane array should to be 4 times the final image rate in the case of bidimensional scanning and 2 times in the case of the unidimensional scanning.

As one skilled in the art will readily understand, in practice, the response time of a single detector of the focal plane array should be shorter that the refresh period of a single acquisition frame. The frequency of activation of the microdisplacement system should be enough smaller than the natural frequency of oscillation of the microdisplacement system in order to keep full control over the displacement of the image and to reduce noise generation. Finally, the images acquired (fields) to generate the final image (frame) must be assembled according to the sequence of displacement of the microscan mechanism as illustrated in FIG. 4.

Of course, numerous modifications could be made to the embodiments above without departing from the scope of the invention as defined in the appended claims.

The invention claimed is:

1. An optical imaging system for obtaining a high-resolution image of an observation area from a plurality of low-resolution images, each of said low-resolution images covering the entire observation area, said system comprising:
   a Cassegrain-type objective for forming said low-resolution images, said objective comprising a primary mirror defining a concave optical surface and a secondary mirror disposed coaxially with said primary mirror, said secondary mirror having a mirror plane and defining a convex optical surface therealong;
   a focal plane array generally disposed at a focal plane of said Cassegrain-type objective for detecting said low-resolution images therefrom;
   a microdisplacement mechanism for pivoting as a whole said secondary mirror about first and second orthogonal axes in said mirror plane to displace in a leveraged manner said low-resolution images as a whole between different positions along the focal plane array according to an acquisition sequence, for detection at said different positions; and
   imaging means connected to said focal plane array for detecting the low-resolution images at each of said different positions and combining said low-resolution images according to a frame generation sequence matching said acquisition sequence to obtain said high-resolution image.

2. The optical imaging system according to claim 1, wherein said microdisplacement mechanism comprises first and second actuating means each exerting a force on said secondary mirror for pivoting said mirror about said first and second orthogonal axes, respectively.

3. The optical imaging system according to claim 2, wherein said forces exerted by the first and second actuating means are directed generally transversally to the mirror plane of the secondary mirror.

4. The optical imaging system according to claim 3, wherein said first and second actuating means operate said pivoting of the secondary mirror at a non-resonant frequency.

5. The optical system according to claim 3, wherein each of said first and second actuating means comprises a spring-driven actuator operating in a fully compressed mode.

6. The optical imaging system according to claim 5, wherein each of said spring-driven actuators comprises a piezoelectric element.

7. The optical imaging system according to claim 1, wherein said Cassegrain-type objective further comprises at least one correction refractive element for correcting aberrations in said low-resolution images.

8. The optical imaging system according to claim 7, wherein said at least one correction refractive element comprises a corrector element disposed in a path of light entering said Cassegrain-type objective.

9. The optical imaging system according to claim 7, wherein said at least one correction refractive element comprises a corrector element disposed between said secondary mirror and said focal plane array.

10. The optical imaging system according to claim 1, wherein said focal plane array is positioned at an apex of said primary mirror.

11. The optical imaging system according to claim 1, wherein said focal plane array is positioned beyond an apex of said primary mirror, and said primary mirror is provided with an opening extending therethrough at said apex thereof.

12. The optical imaging system according to claim 1, wherein said Cassegrain-type objective comprises a housing structure supporting said primary and secondary mirrors.

13. The optical imaging system according to claim 12, wherein said housing structure, primary mirror and secondary mirror are all made of a same material, thereby forming an athermalized ensemble.

14. The optical imaging system according to claim 13, wherein said microdisplacement mechanism comprises athermalized first and second actuating means each exerting a force on said secondary mirror for pivoting said mirror about said first and second orthogonal axes, respectively.

15. The optical imaging system according to claim 14, wherein each of said first and second athermalized actuating means comprises:
   an actuator exerting a force on said secondary mirror directed generally transversally to the mirror plane, said actuator being subject to temperature induced length variations; and
   an athermalizing structure compensating for an effect of said temperature induced length variations on the pivoting of the secondary mirror.

16. The optical imaging system according to claim 15, wherein, for each of said athermalized actuating means, the athermalizing structure comprises:
   a lever subject to temperature induced length variations opposite the temperature induced length variations of the actuator, said lever having a first end interconnected with said actuator and a second end interconnected with a generally temperature-invariant pivot.

17. The optical imaging system according to claim 16, wherein said actuator is a piezoelectric element, said lever is made of aluminum and said pivot is made of invar.

18. The optical imaging system according to claim 1, in combination with a complementary imaging system similar to said optical imaging system, said complementary imaging system being positioned coaxially to said optical imaging system rearwardly of the secondary mirror thereof and non-obstructively to light entering said optical imaging system.

19. The combination according to claim 18, further comprising a signal combiner for combining the high-resolution images obtained by said optical imaging system and said complementary imaging system.

* * * * *